US006568146B2

(12) United States Patent
Harvey

(10) Patent No.: US 6,568,146 B2
(45) Date of Patent: May 27, 2003

(54) METHOD OF MANUFACTURING DECORATIVE CEMENTUOUS FLOOR SURFACE

(76) Inventor: James Harvey, 13614 - SR - 9 SC, Snohomish, WA (US) 98296

( * ) Notice: Subject to any disclaimer, the term of this patent is extended or adjusted under 35 U.S.C. 154(b) by 0 days.

(21) Appl. No.: 09/858,298

(22) Filed: May 15, 2001

(65) Prior Publication Data
US 2002/0059776 A1 May 23, 2002

Related U.S. Application Data
(60) Provisional application No. 60/246,458, filed on Nov. 7, 2000.

(51) Int. Cl.$^7$ ................................................. E04B 1/04
(52) U.S. Cl. ............................. 52/741.41; 52/309.13; 52/309.17
(58) Field of Search ............................ 52/309.1, 596, 52/612, DIG. 7, 741.41, 309.13, 309.17

(56) References Cited

U.S. PATENT DOCUMENTS

| 2,277,203 A | 12/1942 | Boult |
| 4,085,246 A | 4/1978 | Buser et al. |
| 4,159,301 A | 6/1979 | Buser et al. |
| 4,908,257 A | 3/1990 | Baskin |
| 4,956,030 A | 9/1990 | Baskin |
| 5,043,377 A | 8/1991 | Nogi et al. |
| 5,275,852 A | 1/1994 | Jones et al. |
| 5,338,584 A | 8/1994 | Kubota et al. |
| 5,403,631 A | 4/1995 | Sato et al. |
| 5,494,729 A * | 2/1996 | Henry et al. ................. 428/147 |
| 5,794,401 A | 8/1998 | Shaw et al. |
| 5,922,257 A | 7/1999 | Keesling |
| 6,016,635 A * | 1/2000 | Shaw et al. ............... 52/741.41 |

* cited by examiner

Primary Examiner—Carl D. Friedman
Assistant Examiner—Yvonne M. Horton
(74) Attorney, Agent, or Firm—Dean A. Craine

(57) ABSTRACT

A method of manufacturing a low-moisture penetrating decorative floor surface. The completed floor surface has an appearance of a solid granite slab floor with greater durability. The floor surface has a smooth, flat appearance and can be manufactured in different shapes. The floor surface may be formed over a wood or concrete sub-floor and includes a self-leveling, cementous, low moisture penetrating material to which suitable colorants may be added. The cementous material comprises a topping and silicate-based sealant mixture that is mixed together and poured and leveled over the sub-floor to a desired height. Flakes of contrasting material is then sprinkled over the top surface of the mixture to create a decorative appearance. After drying, the surface is finely ground to a smooth finish. A coat of silicate-based sealant is then applied to the surface that penetrates the porous surface to create a low moisture emitting surface The surface is then ground to a fine surface and rinsed.

7 Claims, 2 Drawing Sheets

METHOD OF MANUFACTURING DECORATIVE CEMENTUOUS FLOOR SURFACE

This is a utility patent application based on a provisional patent application (Ser. No. 60/246,458) filed on Nov. 7, 2000.

BACKGROUND OF THE INVENTION

1. Field of the Invention

This invention pertains to floor surfaces, and, more particularly, to floor surfaces made of concrete or tile.

2. Description of the Related Art

It is well known that a major cause of failure for concrete floor systems is moisture emitted from the soil. Moisture is the most costly post-construction "defect" because it typically happens within a year after the owner takes occupancy and causes mold contamination problems.

The moisture is in the form of vapor emission that travels upward from the soil and through microscopic capillaries within the concrete. The differential of temperature and humidity between the soil and the building interior causes vapor to be drawn out through the concrete and into the building's air space or trapped under a low permeable flooring material.

As the water molecules travel upward through concrete, alkaline salts are leached onto the top surface of the concrete. Both water molecules and the alkaline salts can cause deterioration of the adhesive and foam layers used in many floor systems.

Floor tile and flagstone are very popular interior and exterior floor surfaces. Tiles available in both glazed or unglazed surfaces and are available in a wide variety of sizes, colors, patterns and finishes (from glossy to dull matte). Typically, floor tiles are made of ceramic, linoleum, vinyl, asphalt or vinyl-asbestos material sold in 6 to 12 inches squares. Rectangular, hexagonal, octagonal, and rounded-corner tiles are commonly available as well. Sheet-mounted tiles consist of evenly spaced tiles mounted on a backing sheet of paper, plastic or silicone tabs. The sheets are 12×12 inches or larger and reduce the labor costs in correctly positioning and spacing the individual tiles. Mosaic tiles are normally sheet mounted.

One drawback with tiles is that they must be used with expansion joints between the tiles to protect them from cracking due to expansion and contraction of the substrate. A second drawback with tiles is that the tiles located along the edges must be cut to size to size. This is especially troublesome when tiling "free-form" areas with different radius curves. A third drawback is that specific types of tiles, such as ceramic tiles, are relatively brittle and porous which makes them susceptible to cracking and staining. A fourth drawback is that the thickness of the substrate may need to be adjusted so that the top surface of the tiles are level and set at the desired elevation.

In addition to tile, other durable materials, such as aggregate concrete, brick, flagstone, slate, marble and granite, may be used as a floor surface. While aggregate concrete and brick are the most durable and the less expensive floor surface, they easily stain and are generally considered less attractive. Although flagstone and slate are attractive, they too are easily stained and only available in irregular sizes thus making installation more difficult and expensive. While marble may be more durable, marble is relatively rare thus making it too expensive to use on a wide scale basis.

Granite is a widely available, coarse-rained rock composed of a quartz and feldspar with lesser quantities of mica and other colored minerals such as biotite and hornblende. Granite is usually whitish or gray with a speckled appearance caused by darker crystals. It has greater strength than sandstone, limestone, and marble, and is therefore more difficult to quarry. Because it is more difficult to quarry, it cost nearly the same as marble.

Granite is available in solid slabs and tiles. Solid slabs are generally used as countertops, hearths, and mantles because they produce, flat, smooth attractive surfaces not susceptible to staining. While solid slabs could be used on floor surfaces, they generally are not due to their cost, difficulty in installation, and brittleness.

One drawback of floor surfaces made of natural materials is that color imperfections often occur in the individual tiles. Finding a sufficient quantity of tiles without color imperfections or with consistent color imperfections may be difficult.

What is needed is a low water-penetrating floor surface that has the durability and ease of installation and maintenance as a concrete floor surface, but has a decorative, flat, smooth, and consistent finish equal to that of a granite slab floor surface.

SUMMARY OF THE INVENTION

It is a general object of the invention to provide a decorative, low water penetrating concrete floor.

It is another object of the present invention to provide such a floor surface that is made of self-leveling, cementuous material capable of being poured-in-place for easier installation.

It is a further object of the invention to provide such a finished floor surface that has a decorative, flat, smooth granite-like appearance.

These and other objects of the invention which will become apparent are met by a method of manufacturing a concrete, granite-appearing floor surface. The floor surface has a smooth, flat appearance and can be manufactured in place for different shapes and size spaces. The system is used to create a floor surface formed over a new or existing concrete sub-floor or over wood sub-floor. When formed over an existing concrete sub-floor, a penetrating, silicate-based sealant is applied to the top surface of the sub-floor and allowed to penetrate into the small capillaries normally formed therein. After the silicate-based sealant has dried, a mixture of a self-leveling, cementous-based fine topping and the silicate-base sealant is mixed on site under partially controlled conditions and poured in place to produce a consistent floor surface. Suitable colorants may be added to the topping-sealant mixture. After thorough mixing, the topping-sealant mixture is then poured into forms located over the sub-floor. The amount of the topping-sealant mixture poured into the form may be adjusted for any desired height. The topping-sealant mixture is then screed to evenly spread out the topping mixture and to create a relatively flat top surface. Flakes of contrasting material called "fines" are then sprinkled over the top surface of the topping-sealant mixture to simulate a decorative surface. After drying, the top surface is finely ground to a smooth finish. An optional outer coat of penetrating silicate-based sealant may be applied to the top surface of the dried topping-sealant mixture to create a waterproof seal. After the outer coat of sealant has dried, the surface is then ground to a fine surface.

As mentioned above, the above described method may be used on a new concrete floor or old concrete floor. When formed over a new concrete sub-floor, the penetrating silicate-base sealant must be applied to the top surface of the concrete while the concrete is "green". This ensures that the silicate-based sealant deeply penetrates and fills the small capillaries formed in the concrete to reduce moisture emission and penetration and reduce alkalinity that often destroy overlayment materials typically applied over the sub-floor. All of the subsequent steps listed above are then followed to produce a low moisture penetrating, decorative concrete floor surface.

There as thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Figure 1:
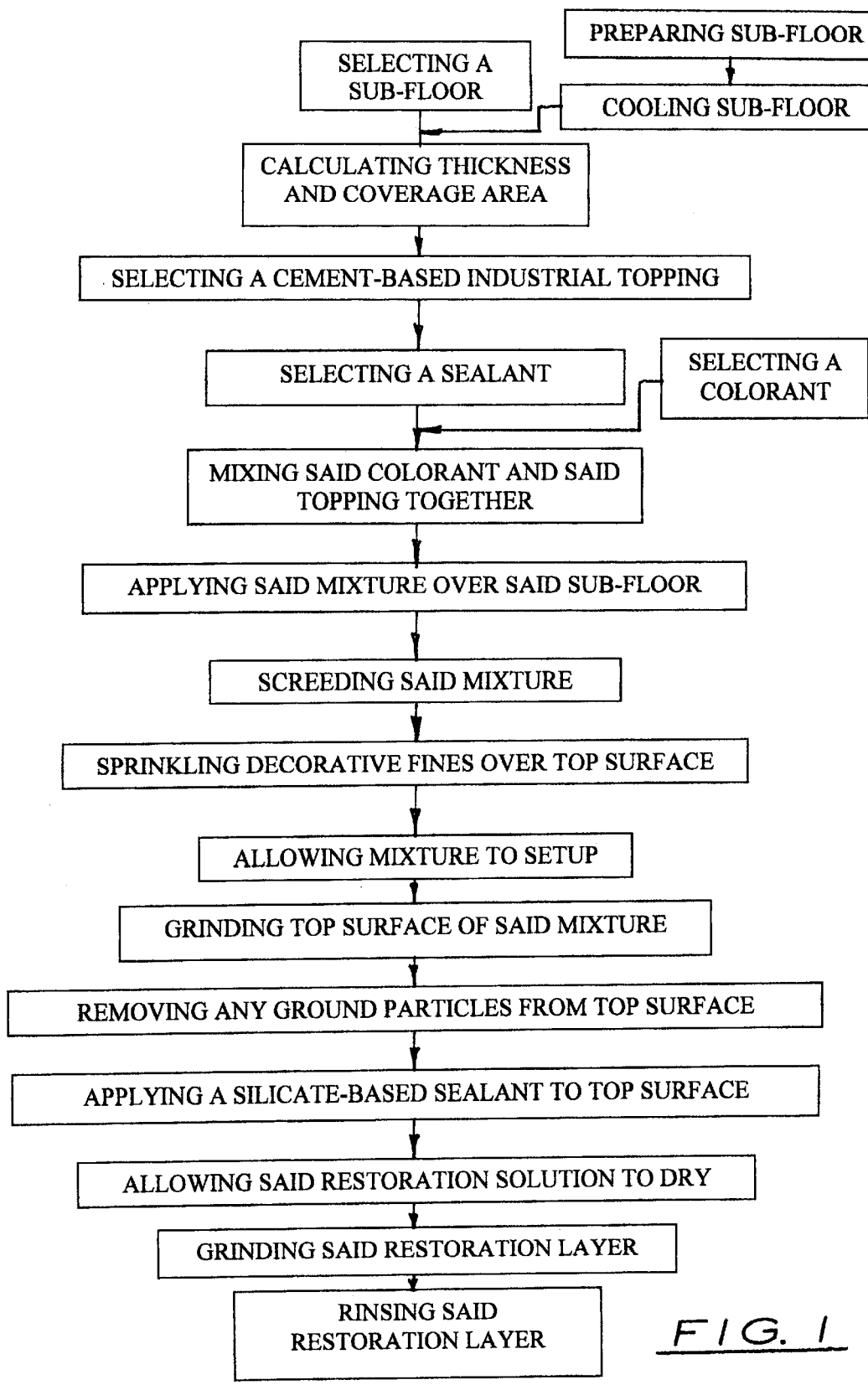
FIG. 1 is an illustration of the steps used to manufacture the cement based, granite appearing floor surface.

Referring to the accompanying FIG 1, there is described a method of manufacturing a decorative floor surface with improved overlayment holding properties. The decorative floor surface can be constructed over "old" concrete surfaces or over "new" concrete surfaces. In both types of application, a smooth, flat, decorative finish floor is create with improved moisture and alkalinity control.

When constructing the decorative floor over an "old" concrete sub-floor, the old concrete floor is first scrubbed and cleaned. Next, a cementuous, self-leveling topping is selected and mixed with a silicate-based sealant. In the preferred embodiment, the topping is a poly-modified cement-based product that is mixed with an appropriate amount of water to produce a dry self-leveling consistency. The topping and water are both kept at a temperature range between 55 degrees to 75 degrees F.

After preparing the topping, a silicant-base sealant is added to the topping to create a topping-sealant mixture. Suitable colorants may be added to the topping-sealant mixture to produce the desired color floor surface. After thoroughly mixing, the topping-sealant mixture is poured into forms located over the sub-floor. The temperature of the sub-floor may also be manufactured between 55 degrees to 70 degrees F. The amount of the topping-sealant mixture poured into the form may be adjusted for any desired height. The topping-sealant mixture is then screed to evenly spread out the topping mixture and to create a relatively flat top surface. After setting up for a short time (60 minutes), #2-5 fines of contrasting material, such as rock, glass, metal, etc. is then sprinkled over the top surface of the topping-sealant mixture to simulate a desired decorative surface. The surface is then allowed to air cure for 12 to 48 hours.

After drying, the top surface is finely ground to a smooth finish. A coat of deep penetrating silicate sealant is then applied to the top surface and allowed to seep and penetrate the capillaries in the surface. When dried, the silicate sealant also acts to harden the surface.

After drying the surface is then progressively ground to a fine surface using between 100 to 3,000 grid sanding wheels.

Figure 2:
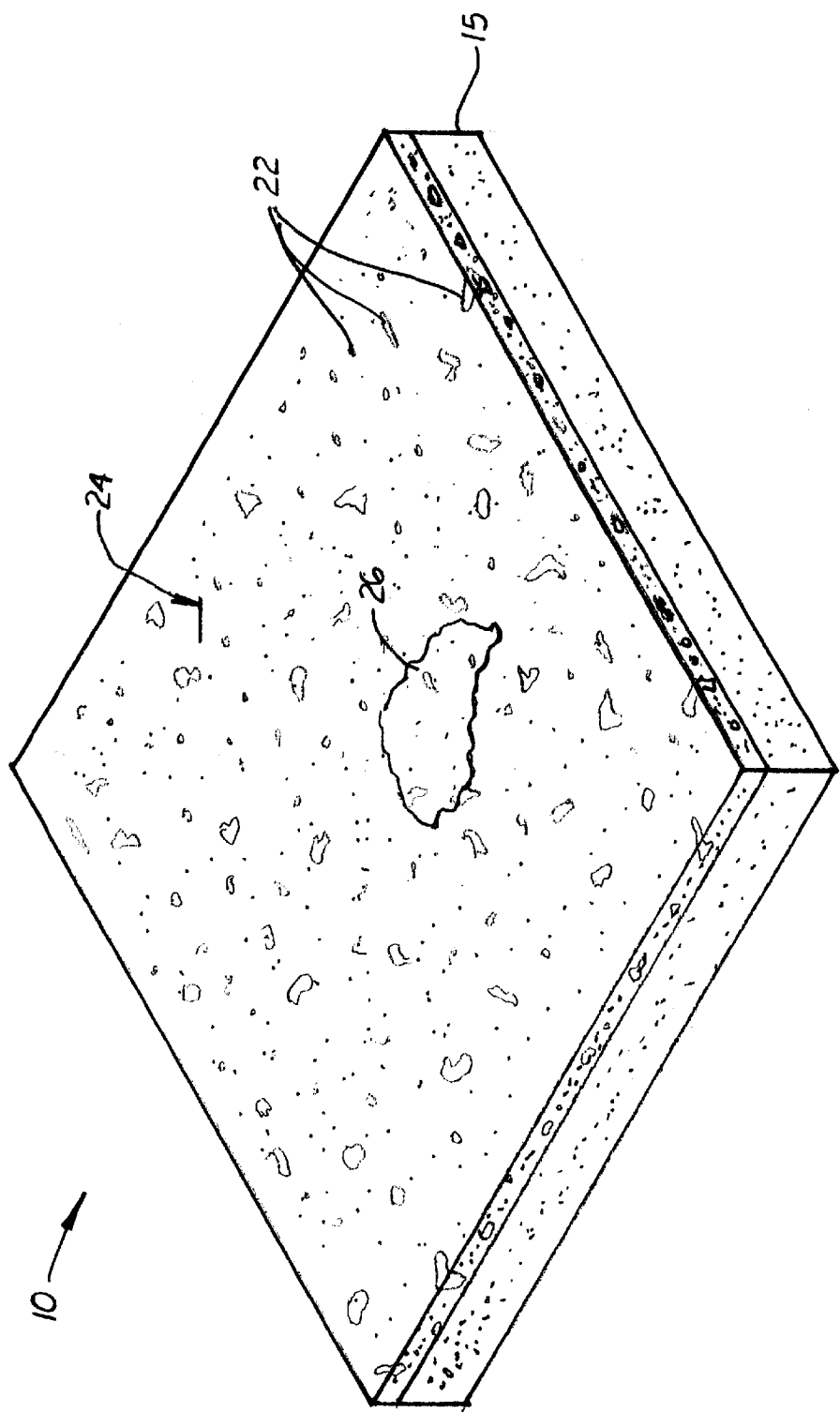
FIG. 2 is partial side elevational view of a section of the floor surface created using the method disclosed herein.

Shown in FIG. 2 is a partial, side elevational view of a section of the floor surface 10 constructed over a cement sub-floor 15. The floor surface 10 is approximately ¼ inch thick with the flakes 22 being imbedded into the top surface 24 of the topping-sealant mixture 20 when dried. A sealant layer 26 is then formed over the top surface 24. In the preferred embodiment, the topping mixture is a self-leveling, polymer-modified, industrial topping such as the products sold under the trademarks MASTERTOP 112 TOPPING by Master Builders Technologies, of Cleveland, Ohio, and ARDEX-SDT by Ardex Engineered Cements, Inc. of Aliquippa, Pa. Any cement compatible colorant may be added to the topping to produce the desired color. Such colorants are available from Davis Colors, a division of LaPorte Pigments, Inc. of Los Angeles, Calif.

The flakes #2-#5 are available from any tile cutting facility.

In the preferred embodiment, a deep penetrating, silicate-based sealant is sprayed or applied to the old or new concrete sub-floor, added to the topping to prepare a topping-sealant mixture, and then applied over the cured topping-sealant mixture. Ideally, a deep penetrating, metal-activated catalytic based silicate sealing mixture should be used because it (1) more deeply penetrates pre-formed concrete, (2) more securely bonds with the metal and minerals that exist in concrete, and (3) reduces alkalinity. An example of a silicate-base sealant is a product is sold under the trademark CS2000 by Creteseal Company, of Santa Anna, Calif.

Using the above-referenced silicate containing sealant, approximately 1 gallon of sealant is sprayed over 200 sq. ft. of green or cured concrete. When mixed into the topping, approximately 4 fluid ounces of sealant is mixed with each 55 lb. bag of topping material.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

I claim:

1. A method of manufacturing a durable floor surface over an existing sub-floor comprising the following steps:
   a. selecting a sub-floor;
   b. calculating the thickness and coverage area of the sub-floor;
   c. selecting a cement-based industrial topping;
   d. selecting a silicate-based sealant compatible with said topping;
   e. mixing said topping and said sealant together to form a topping-sealant mixture;
   f. applying said topping-sealant mixture over said sub-floor;
   g. screeding said topping-sealant mixture to obtain desired thickness;

h. sprinkling decorative fines over top surface of said topping-sealant mixture;

i. allow said topping-sealant mixture to set up;

j. grinding the top surface of said topping-sealant mixture;

k. removing any ground particles from the top surface of said topping-sealant mixture;

l. applying a coat of a silicate-based sealant to the top surface of said topping-sealant mixture;

m. allowing said coat of silicate-based sealant to dry;

n. grinding said top surface of said dried silicate-based sealant layer; and, o. rinsing said dried silicate-based sealant layer.

2. The method of manufacturing as recited in claim 1, wherein said sub-floor is made of concrete and a base coat of silicate sealant to said concrete sub-floor before the concrete sub-floor is cured.

3. The method of manufacturing, as recited in claim 1, further including the step of cooling the sub-floor to a temperature between 55 to 70 degrees prior to applying the topping-sealant mixture thereto.

4. The method of manufacturing, as recited in claim 1, further including the step of selecting a desirable colorant and mixing it with said topping-sealant mixture.

5. The method of manufacturing a decorative floor, as recited in claim 1, wherein said silicate-based sealant is a metal, catalytically activated mixture.

6. The method of manufacturing a decorative floor, as recited in claim 2, wherein the amount of said silicate sealant applied to said concrete floor is approximately 1 gallon of sealant to 200 sq. ft. of concrete sub-floor surface.

7. The method of manufacturing a decorative floor, as recited in claim 5, wherein said sealant is mixed with the topping in a ratio of 4 ounces of sealant for every 55 lbs. of topping.

* * * * *